US009843863B2

(12) United States Patent
Kim et al.

(10) Patent No.: US 9,843,863 B2
(45) Date of Patent: Dec. 12, 2017

(54) ELECTRONIC DEVICE AND METHOD OF CONTROLLING THE SAME

(71) Applicant: Samsung Electronics Co., Ltd., Suwon-si, Gyeonggi-do (KR)

(72) Inventors: Min-Seok Kim, Seoul (KR); Sun-Hwan Min, Anyang-si (KR); Sung-Chul Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/071,470

(22) Filed: Mar. 16, 2016

(65) Prior Publication Data

US 2016/0277835 A1 Sep. 22, 2016

(30) Foreign Application Priority Data

Mar. 20, 2015 (KR) .................. 10-2015-0039089

(51) Int. Cl.
*H04R 9/06* (2006.01)
*H04R 1/02* (2006.01)
*H04R 3/12* (2006.01)
*G06F 1/16* (2006.01)
(Continued)

(52) U.S. Cl.
CPC ............. *H04R 3/12* (2013.01); *G06F 1/1688* (2013.01); *G06F 3/03545* (2013.01); *H04R 1/028* (2013.01); *H04R 1/2803* (2013.01); *H04R 1/2811* (2013.01); *G06F 2200/1632* (2013.01); *H04R 2420/03* (2013.01); *H04R 2499/11* (2013.01)

(58) Field of Classification Search
CPC ........... G06F 1/1688; G06F 2200/1632; G06F 3/03545; H04R 1/028; H04R 1/2803; H04R 1/2811; H04R 2420/03; H04R 2499/11; H04R 3/12
USPC ........ 381/59, 80, 81, 82, 84, 85, 89, 97, 99, 381/123, 124, 164, 189, 190, 300, 303, 381/307, 334, 336, 351, 350, 352, 402
See application file for complete search history.

(56) References Cited

U.S. PATENT DOCUMENTS

RE42,738 E 9/2011 Williams
8,897,033 B2 * 11/2014 Slipy .................. H04M 1/0202
248/70
9,351,061 B1 * 5/2016 Wollersheim ............ H04R 5/04
(Continued)

FOREIGN PATENT DOCUMENTS

KR 10-2005-0010373 A 1/2005
KR 10-2007-0040440 A 4/2007
(Continued)

*Primary Examiner* — Khai N Nguyen
(74) *Attorney, Agent, or Firm* — Jefferson IP Law, LLP

(57) ABSTRACT

An electronic device and a method of controlling the electronic device are provided. The electronic device includes a main body configured to provide an accommodation space, a speaker module configured to output sound, and an accessory device configured to be accommodated in the accommodation space. In a state where the accessory device is accommodated in the accommodation space, the accessory device is configured to provide a passage that transmits the sound output from the speaker module, and in a state where the accessory device is separated from the accommodation space, the accommodation space provides the passage that transmits the sound output from the speaker module.

11 Claims, 13 Drawing Sheets

(51) Int. Cl.
   *H04R 1/28*    (2006.01)
   *G06F 3/0354*  (2013.01)

(56) References Cited

U.S. PATENT DOCUMENTS

| | | | |
|---|---|---|---|
| 2010/0061055 A1 | 3/2010 | Dabov et al. | |
| 2010/0327065 A1* | 12/2010 | Van Schaack | G06F 3/03545 235/454 |
| 2012/0125942 A1* | 5/2012 | Chang | H01R 13/5202 220/661 |
| 2012/0140428 A1 | 6/2012 | Hsu | |
| 2013/0024018 A1* | 1/2013 | Chang | G08C 17/02 700/94 |
| 2013/0094680 A1* | 4/2013 | Allen | H04R 1/1041 381/190 |
| 2013/0286623 A1* | 10/2013 | Slipy | H04M 1/0202 361/807 |
| 2014/0029783 A1 | 1/2014 | Yang | |
| 2014/0038525 A1 | 2/2014 | Cha et al. | |
| 2014/0044278 A1* | 2/2014 | Wiklof | H04R 1/028 381/91 |
| 2014/0111489 A1* | 4/2014 | Edgecomb | G06F 3/03545 345/179 |
| 2014/0306909 A1 | 10/2014 | Pedersen et al. | |
| 2015/0055789 A1* | 2/2015 | Bernal Castillo | G10K 11/178 381/71.6 |
| 2015/0116284 A1* | 4/2015 | Black | G06F 3/03545 345/179 |
| 2016/0202224 A1* | 7/2016 | Lloyd | G01N 33/0016 73/865.8 |
| 2016/0299606 A1* | 10/2016 | Go | G06F 3/046 |

FOREIGN PATENT DOCUMENTS

| | | |
|---|---|---|
| KR | 10-2013-0091185 A | 8/2013 |
| KR | 10-2014-0016090 A | 2/2014 |

* cited by examiner

ELECTRONIC DEVICE AND METHOD OF CONTROLLING THE SAME

CROSS-REFERENCE TO RELATED APPLICATION(S)

This application claims the benefit under 35 U.S.C. §119(a) of a Korean patent application filed on Mar. 20, 2015 in the Korean Intellectual Property Office and assigned Serial number 10-2015-0039089, the entire disclosure of which is hereby incorporated by reference.

TECHNICAL FIELD

The present disclosure relates to an electronic device (e.g., an electronic device that includes a speaker module) and a method of controlling the electronic device (hereinafter, also referred to as an "electronic device control method").

BACKGROUND

An electronic device refers to a device that performs a specific function according to an equipped program, such as an electronic scheduler, a portable multimedia reproducer, a mobile communication terminal, a tablet personal computer (PC), an image/sound device, a desktop/laptop PC, or a vehicular navigation system, as well as a home appliance. For example, such an electronic device may output information stored therein as sound or an image. As the integration degree of such an electronic device has increased, and super-high speed and large capacity wireless communication has been popularized, various functions have recently been equipped in a single mobile communication terminal. For example, functions, such as an entertainment function (e.g., a game function), a multimedia function (e.g., a music/video reproducing function), a communication and security function for mobile banking, a schedule management function, and an e-wallet function, are integrated in a single electronic device, in addition to a communication function.

As the multimedia function of the electronic device is strengthened, the size of a display device that is equipped in the electronic device is continuously enlarged and the resolution of the display device is also continuously enhanced. A touch screen function is equipped in the display device such that the display device can replace an input device, such as a mechanically operated keypad. In addition, by reducing the thickness of the electronic device, the electronic device can be easily carried while enlarging the size of the display device and enhancing the resolution of the display device.

Upon being improved in performance, the display device can provide a more evolved sensibility and more diverse user experiences. For example, by enabling a stylus pen input, a user's handwriting and various sketches can be input and stored in greater detail. Such a stylus pen may be accommodated in the electronic device.

Sound quality is also improved to accommodate the strengthened multimedia function. However, due to the trend of reducing the thickness of electronic devices, an improvement in sound quality is marginal as compare to the performance improvement of the display device, and the like. For example, in order to improve the sound quality, it is necessary to secure a sufficient resonance space for a speaker module. However, it may be difficult to secure a resonance space under the environment where the thickness of electronic devices is thinned and the integration degree in arranging electronic components is improved.

Furthermore, the resonance space for a speaker module may be further narrowed within an electronic device in which a stylus pen, and the like, is accommodated.

Therefore, a need exits for an electronic device that can use a restricted internal space, and a control method thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that can use a restricted internal space, and a control method thereof.

Another aspect of the present disclosure is to provide an electronic device that enables a reception space for an accessory device, such as a stylus pen, and a resonance space for a speaker module to be secured within a restricted internal space, and a control method thereof.

Another aspect of the present disclosure is to provide an electronic device that can enhance a degree of freedom in exterior design, and a control method thereof.

In accordance with an aspect of the present disclosure, an electronic device is provided. The electronic device includes a main body that provides an accommodation space, a speaker module that outputs sound, and an accessory device configured to be accommodated in the accommodation space. In a state where the accessory device is accommodated in the accommodation space, the accessory device may provide a passage that transmits the sound output from the speaker module, and in a state where the accessory device is separated from the accommodation space, the accommodation space may provide the passage that transmits the sound output from the speaker module.

The accommodation space or a portion of the accessory device can contribute to the improvement of sound quality by being connected to a resonance space of the speaker module as, for example, a back volume.

In accordance with another aspect of the present disclosure, a method of controlling an electronic device that radiates sound through an accommodation space or an accessory device configured to be accommodated in the accommodation space is provided. The method includes an operation of activating a speaker module that outputs sound, an operation of detecting whether the accessory device is accommodated in the accommodation space, and an operation of providing different sound signals to the speaker module depending on whether the accessory device is accommodated.

The electronic device control method described above may be executed through a processor or an audio module that is provided in the electronic device or an integrated circuit (IC) chip which is equipped with at least one of the processor and the audio module.

The above-described electronic device can efficiently use an inner space thereof by using a space that accommodates an accessory device, such as a stylus pen, or the accessory device configured to be accommodated in the space, as a sound radiation passage or a resonance space. Accordingly, a resonance space, and the like, for improving the sound quality of the speaker module can be easily secured even in an electronic device that has a restricted inner space (e.g., an electronic device that includes a separate space for accommodating an accessory device). In addition, since sound can be radiated through the accommodation space or the accessory device even if a hole, and the like, is not separately formed to radiate the sound of the speaker module that is embedded in the electronic device, the degree of freedom in designing the exterior of the electronic device can be further enhanced. Furthermore, by controlling the output of the speaker module differently to be suitable depending on whether the accessory device, such as a stylus pen, is accommodated, a deviation in sound quality depending on whether the accessory device is accommodated can be compensated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
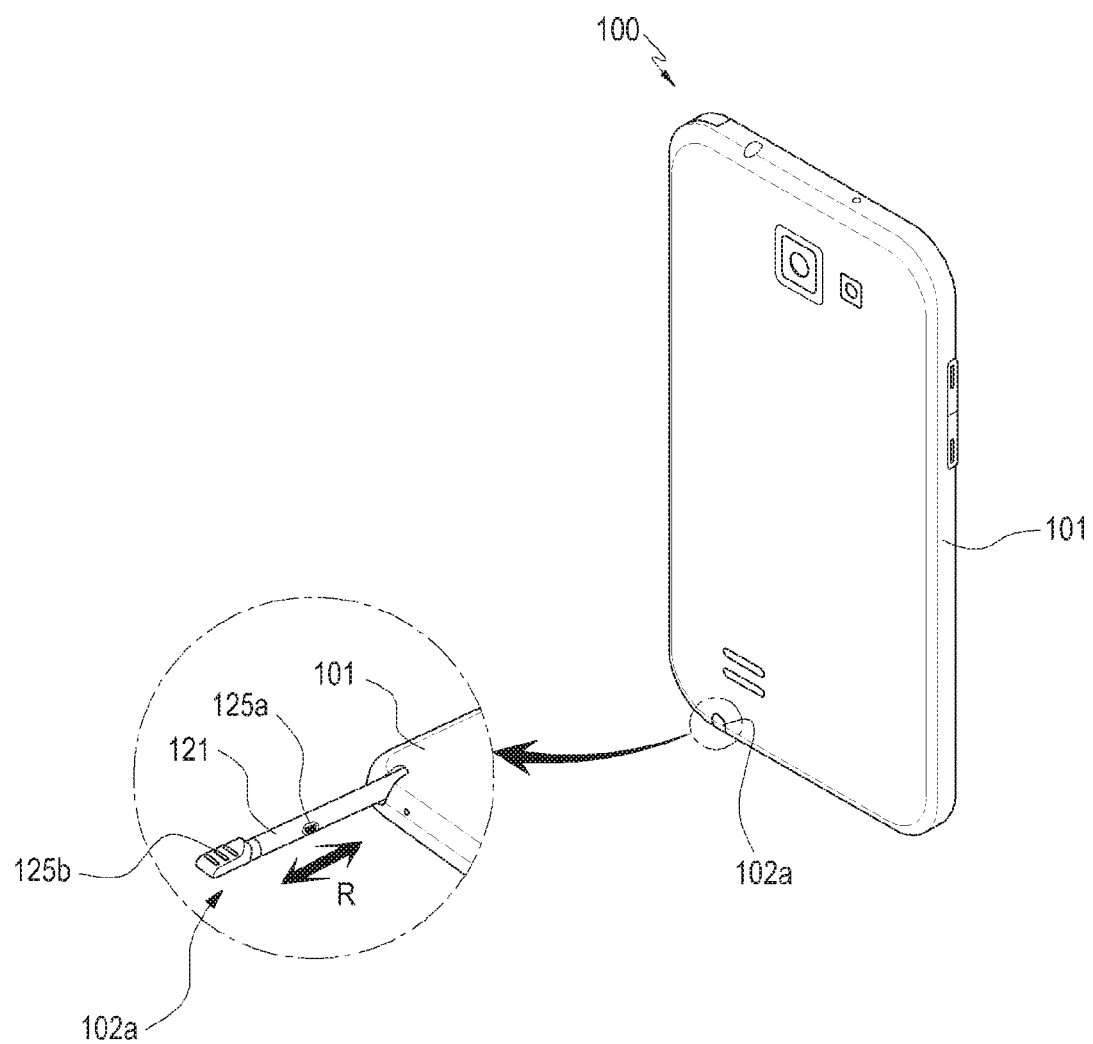
FIG. 1 is a perspective view illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). In contrast, it may be understood that when an element (e.g., the first element) is referred to as being "directly connected," or "directly coupled" to another element (second element), there are no element (e.g., the third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

In the present disclosure, the terms are used to describe specific embodiments of the present disclosure, and are not intended to limit the present disclosure. As used herein, the singular forms are intended to include the plural forms as well, unless the context clearly indicates otherwise. In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present disclosure should not be interpreted to exclude embodiments of the present disclosure.

In the present disclosure, an electronic device may be a random device, and the electronic device may be called a terminal, a portable terminal, a mobile terminal, a communication terminal, a portable communication terminal, a portable mobile terminal, a display device, and the like.

For example, the electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server, and the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless LAN (WLAN), a wide area network (WAN), an Internet, a small area network (SAN), and the like, but is not limited thereto.

Figure 2:
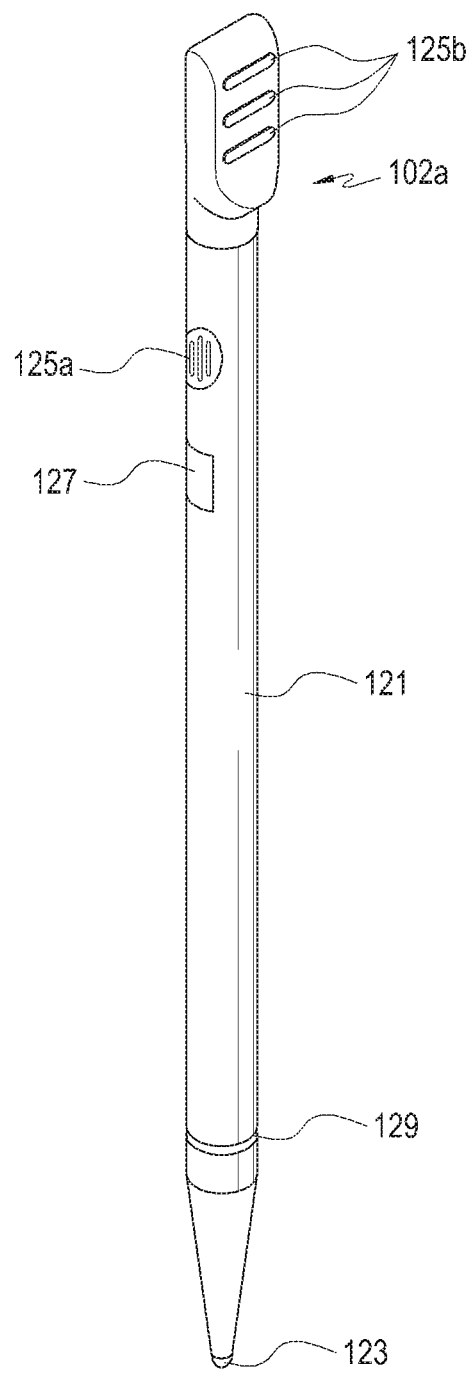
FIG. 2 is a perspective view illustrating an accessory device of an electronic device according to an embodiment of the present disclosure.

FIG. 1 is a perspective view illustrating an electronic device according to an embodiment of the present disclosure. FIG. 2 is a perspective view illustrating an accessory device of an electronic device according to an embodiment of the present disclosure.

Referring to FIGS. 1 and 2, according to various embodiments of the present disclosure, an electronic device 100 may include a main body 101 that is formed as a bar-type housing, and an accessory device (e.g., a stylus pen 102a) that is accommodated in the main body 101.

The main body 101 may accommodate a circuit board, on which an integrated circuit (IC) chip, and the like, that controls overall operations of the electronic device 100, and although not illustrated, may include an input/output device, such as a display device, a camera module, a microphone, a speaker phone, and the like. A key pad, in which a touch panel is incorporated to input characters, numerals, and the like, is implemented in the display device that is provided on the main body 101. The main body 101 may further include various connectors for connecting a key(s) that adjusts power or volume, an earphone, a head set, a charger, and the like. It is noted that the above-mentioned components of the main body 101 may be omitted in the accompanying drawings or may not be assigned a reference numeral.

The stylus pen 102a may be used as an accessory device for operating the touch panel. In general, the touch panel may detect a portion of a user's body (e.g., a finger) that comes closer to the touch panel or touches the touch panel. In order to make a fine input, for example, in order to input handwriting, sketch, and the like, the stylus pen 102a may be used. The stylus pen 102a itself may transmit a minute electrical current of the user's body to the touch panel so as to generate an input signal. According to various embodiments of the present disclosure, a separate resonance circuit is embedded in the stylus pen 102a to be interlocked with a digitizer that is equipped in the main body 101.

The stylus pen 102a may include a body 121 that extends in a longitudinal direction, and a tip 123 that is provided in an end of the body 121. The tip 123 may have a sharp shape to be capable of finely selecting a contact position, and the like. However, in order to prevent damage at the time of coming in contact with the display device, the end may be machined as a curved surface. The stylus pen 102a may include input holes 125a, through which sound, and the like, is input, and radiation holes 125b. The input holes 125a may be formed at a proper position on the body 121 to be exposed to the outer peripheral surface. The radiation hole 125b may be formed in one end of the stylus pen 102a (e.g., the other end of the body 121). Within the stylus pen 102a, the radiation holes 125b may be connected with the input hole 125a. For example, at least a portion of the body 121 (e.g., the portion between the input hole 125a and the radiation hole 125b) may take the form of a tube.

The stylus pen 102a may be inserted into and accommodated in the main body 101 in one direction R (hereinafter, referred to as an "accommodating direction"). The stylus pen 102a may be partially exposed to the outside of the main body 101 even in the state where the stylus pen 102a is accommodated in the main body 101. This is to allow the user to easily separate the stylus pen 102a from the main body 101. In addition, in order to allow the user to separate the stylus pen 102a from main body 101, the outer peripheral surface of the other end of the body 121 may be formed with bumps. When the radiation holes 125b are formed, the radiation holes 125b may replace the bumps. For example, by forming a plurality of elongated holes that extend perpendicular to the accommodating direction R, the elongated holes may form the radiation hole 125b, and may be used as a means for separating the stylus pen 102a from the main body 101. The body 121 may be formed in a rod shape or a cylindrical shape. However, the portion exposed to the outside of the main body 101 (e.g., the other end of the body 121) may be formed with a portion that protrudes to be flush with the outer peripheral surface of the main body 101. The radiation holes 125b may also be formed in the portion that protrudes from the other end of the body 121.

According to various embodiments of the present disclosure, the stylus pen 102a may include a magnetic body 127, a fastening recess 129, and the like. The magnetic body 127 or the fastening recess 129 may prevent the styles pen 102a from being released from the main body 101 in the state the stylus pen 102a is accommodated in the main body 101. For example, another magnetic body, which corresponds to the magnetic body 127 or a fastening device, which corresponds to the fastening recess 129, may be embedded in the main body 101 such that the other magnetic body or the fastening device can fix the stylus pen 102a in the state where the stylus pen 102a is accommodated in the main body 101. Accordingly, the stylus pen 102a can be stably accommodated in the main body 101 unless the user forcibly separates the stylus pen 102a from the main body 101.

According to various embodiments of the present disclosure, the magnetic body 127 may be used to detect whether the stylus pen 102a is accommodated. For example, a Hall sensor 117 (see, FIG. 3) to detect a magnetic field is embedded in the main body 101 to detect a magnetic field that is formed by the magnetic body 127 so that it is possible to detect whether the stylus pen 102a is accommodated. Such a configuration will be discussed with reference to FIG. 3, and the like.

Figure 3:
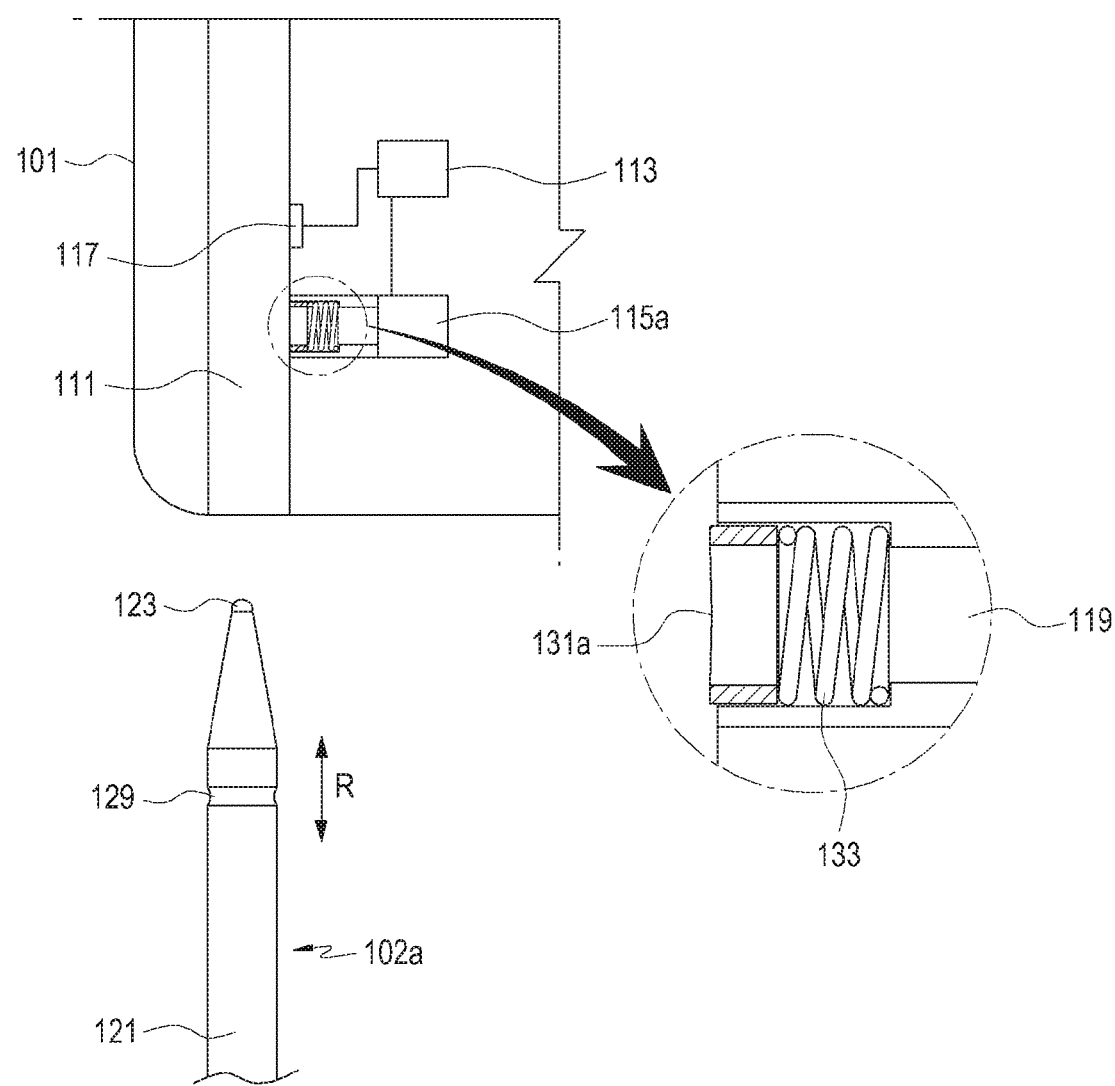
FIG. 3 is a diagram illustrating an aspect in which an accessory device is being accommodated in an electronic device according to an embodiment of the present disclosure.
Figure 4:
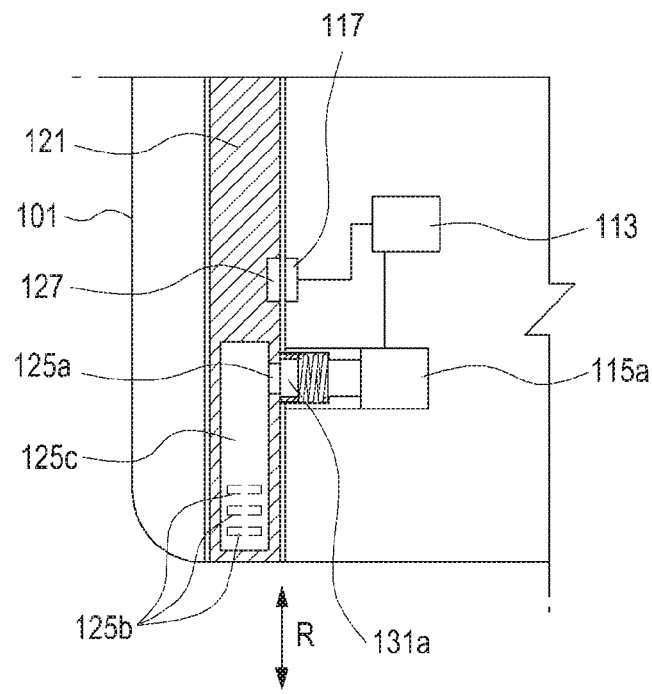
FIG. 4 is a diagram illustrating an aspect in which an accessory device is accommodated in an electronic device according to an embodiment of the present disclosure.

FIG. 3 is a diagram illustrating an aspect in which an accessory device is being accommodated in an electronic device according to an embodiment of the present disclosure. FIG. 4 is a diagram illustrating an aspect in which an accessory device is accommodated in an electronic device according to an embodiment of the present disclosure.

Referring to FIGS. 3 and 4, the electronic device 100 may include an accommodation space 111 that extends along the accommodating direction R, and a speaker module 115a that is arranged adjacent to the accommodation space 111. The sound output from the speaker module 115a may be radiated to the outside through the accommodation space 111. For example, the main body 101 may be formed with a first sound waveguide 119 that is continued from the speaker module 115a to the accommodation space 111, and an end of the first sound waveguide 119 (e.g., a first output hole) may be formed on the inner wall of the accommodation space 111. In the present embodiment of the present disclosure, it is noted that a first sealing member 131a is arranged in the first output hole, and the first output hole is not assigned a reference numeral. The first sealing member 131a is positioned on the end of the first sound waveguide 119 (e.g., the first output hole), and at least a portion of the first sealing member 131a may protrude from the accommodation space 111. An elastic member 133 may be arranged in the first sound waveguide 119 so as to support the first sealing member 131a. For example, the elastic member 133 may compress the first sealing member 131a such that the first sealing member 131a can be maintained in the state where a portion of the first sealing member 131a protrudes to the accommodation space 111.

The electronic device 100 may include an IC chip 113, and a Hall sensor 117 that is electrically connected to the IC chip 113. Among various circuit devices of the electronic device 100, such as a processor, a communication module, an audio module, and a power management module, one or more modules may be incorporated in the IC chip 113. For example, the IC chip 113 may be equipped with an audio module so as to provide a sound signal to the speaker module 115a. The Hall sensor 117 may be arranged to correspond to the magnetic body 127. For example, in the state where the stylus pen 102a is accommodated in the main body 101, the Hall sensor 117 may be installed at a position where the Hall sensor 117 faces the magnetic body 127. As the Hall sensor 117 detects the magnetic field of the magnetic body 127, it is possible to detect whether the stylus pen 102a is accommodated, and the information that is detected through the Hall sensor 117 may be transmitted to the IC chip 113.

According to various embodiments of the present disclosure, the Hall sensor 117 may be replaced by another magnetic body that corresponds to the magnetic body 127. For example, it is possible to implement a structure that can stably maintain the state in which the stylus pen 102a is accommodated in the main body 101. When the magnetic body 117 is used as a structure to fix the stylus pen 102a, a separate structure to detect whether the stylus pen 102a is accommodated may be further provided. For example, although not illustrated, a switch member may be mounted on the main body 101 to be interfered with the stylus pen 102a that is fully accommodated in the main body 101. Accordingly, when the stylus pen 102a is fully accommodated in the main body 101, for example, when the input holes 125a are connected with the first sound waveguide 119, the ON/OFF state of the switch member, which is mounted on the main body 101, will be changed, and through this, the IC chip 113 can detect whether the stylus pen 102a is accommodated.

In the state where the stylus pen 102a is accommodated in the main body 101, the input holes 125a may be positioned to face the first output hole. The first sealing member 131a may be in slidable contact with the outer peripheral surface of the body 121 while the stylus pen 102a is being inserted into the accommodation space 111, and in the state where the stylus pen 102a is fully inserted into the accommodation space 111, the first sealing member 131a may be in close contact with the outer peripheral surface of the body 121 around the input holes 125a so as to connect the input holes 125a to the first output hole (e.g., the first sound waveguide 119). Between the input holes 125a and the radiation holes 125b, a second sound waveguide 125c may be formed within the inner space of the body 121. Thus, the radiation holes 125b may be connected with the speaker module 115a through the second sound waveguide 125c, the input hole 125a, the first output hole, and the first sound waveguide 119. For example, the radiation holes 125b may be used as a second output hole that radiates the sound output from the speaker module 115a to the outside.

In the state where the stylus pen 102a is not accommodated in the main body 101, the sound output from the speaker module 115a may be radiated to the outside through a portion of the accommodation space 111. For example, a portion of the accommodation space 111 may provide a passage for outputting sound. Accordingly, even if a separate radiation hole is not formed on the outer peripheral surface of the main body 101, the sound from the speaker module 115a, which is embedded in the main body 101, may be output through a portion of the accommodation space 111. Since the sound can be radiated to the outside even if a separate radiation hole is formed other than the accommodation space 111, the degree of freedom in designing the electronic device 100 (e.g., the exterior of the main body 101) can be improved. In addition, a portion of the accommodation space 111 or a portion of the inner space of the stylus pen 102a can be used not only as a sound transfer passage, but also as a resonance space. For example, since a space, which is allocated merely for accommodation, is used as a resonance space, the inner space of the electronic device 100 can be more efficiently used and the sound quality can be improved.

Figure 5:
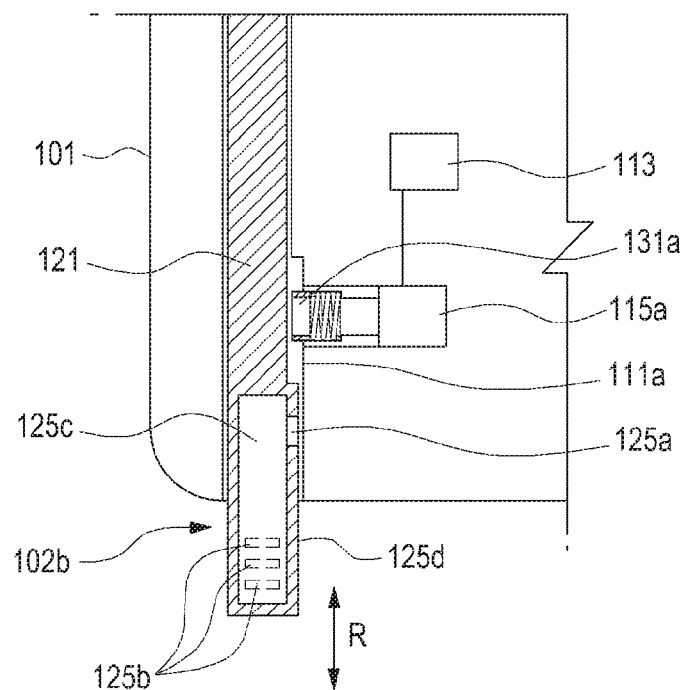
FIG. 5 is a diagram illustrating an aspect in which an accessory device is being accommodated in an electronic device according to an embodiment of the present disclosure.
Figure 6:
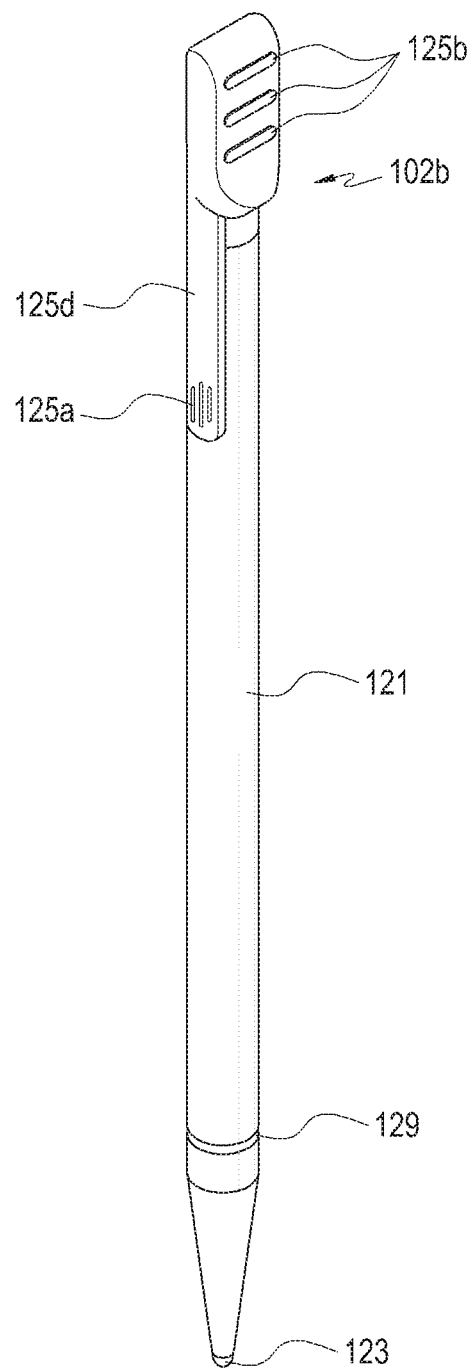
FIG. 6 is a perspective view of an accessory device of an electronic device according to an embodiment of the present disclosure.

FIG. 5 is a diagram illustrating an aspect in which an accessory device is being accommodated in an electronic device according to an embodiment of the present disclosure. FIG. 6 is a perspective view an accessory device of an electronic device according to an embodiment of the present disclosure.

Referring to FIGS. 5 and 6, the electronic device 100 of the present embodiment is different from that of the preceding embodiment in that an accommodating portion 111a and a protrusion 125d are formed on the inner wall of the accommodation space 111 and the outer peripheral surface of the stylus pen 102b, respectively, and a first output hole and an input hole 125a are formed on the accommodating portion 111a and the protrusion 125d, respectively. Accordingly, it is noted that in describing the present embodiment of the present disclosure, components that may be easily understood from the preceding embodiment will be assigned the same reference numerals or reference numerals of some of the components will be omitted, and detailed descriptions thereof may also be omitted.

Referring to FIGS. 5 and 6, the accommodating portion 111a may be formed on the inner wall of the accommodation space 111 and the protrusion 125d, which corresponds to the accommodating portion 111a, may be formed on the outer peripheral surface of the stylus pen 102b. The accommodating portion 111a is formed by being recessed from the inner wall of the accommodation space 111, and may extend from an end of the accommodation space 111 to a position that corresponds to the first output hole along the accommodating direction R. When the stylus pen 102b is inserted into the accommodation space 111, the protrusion 125d can be accommodated in the accommodating portion 111a. In the first output hole, a first sealing member 131a may be arranged by being subjected to an elastic force to protrude from the accommodating portion 111a.

The protrusion 125d may have a shape that extends from the other end of the body 121 along the longitudinal direction of the body 121 and protrudes from the outer peripheral surface of the body 121. The input hole 125a of the stylus pen 102b may be formed on the protrusion 125d at a position that is spaced apart from the other end of the body 121. In the other end of the body 121, the second output hole (e.g., the above-mentioned radiation hole 125b) may be formed, and may be connected to the input hole 125a through the sound waveguide 125c that is formed inside the body 121.

While the stylus pen 102b is being inserted into the accommodation space 111, the first sealing member 131a can maintain the state in which the first sealing member 131a is spaced apart from the outer peripheral surface of the body 121. When the stylus pen 102b is fully inserted into the accommodation space 111 and the protrusion 125d is completely accommodated in the accommodating portion 111a, the input hole 125a may be aligned with the first output hole (e.g., the first sealing member 131a). The shape of the protrusion 125d corresponds to that of the accommodating portion 111a such that the first sealing member 131a may connect the input hole 125a to the speaker module 115a.

By forming the accommodating portion 111a and the protrusion 125d as described above, the first sealing member 131a and the outer peripheral surface of the body 121 may be maintained in the state of being spaced apart from each other in the process of inserting or separating the stylus pen 102b, and in the state where the stylus pen 102b is fully inserted into the accommodation space 111, the first sealing member 131a may connect the input hole 125a to the speaker module 115a. For example, by preventing unnecessary friction of the first sealing member 131a, the endurance of the first sealing member 131a can be enhanced.

Figure 7:
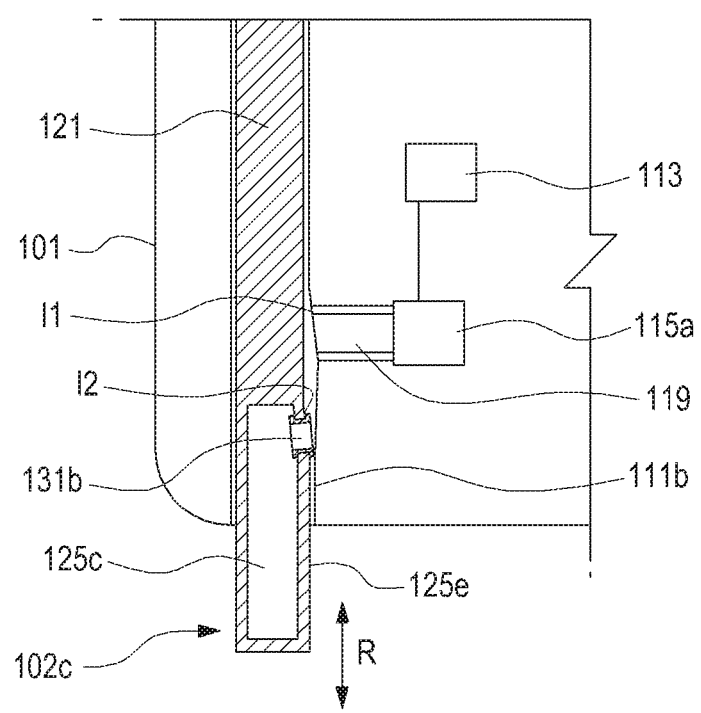
FIG. 7 is a diagram illustrating an aspect in which an accessory device is being accommodated in an electronic device according to an embodiment of the present disclosure.

FIG. 7 is a diagram illustrating an aspect in which an accessory device is being accommodated in an electronic device an according to an embodiment of the present disclosure.

Referring to FIG. 7, the electronic device of the present embodiment are similar to the preceding embodiment in that an accommodating portion 111b and a protrusion 125e are formed to be similar to the accommodating portion 111a and the protrusion 125d, but is different from the preceding embodiment in that the accommodating portion 111b and the protrusion 125e are formed with inclined surfaces I1 and I2, respectively, and a first output hole and an input hole are formed on the inclined surfaces I1 and I2, respectively. In addition, the electronic device of the present embodiment includes a second sealing member 131b that may be arranged on the protrusion 125e (e.g., the input hole).

The inclined surfaces I1 and I2 are formed to be oblique with respect to the accommodating direction R, and may be arranged such that, when the stylus pen 102c is fully inserted into the accommodation space 111, the inclined surfaces I1 and I2 face each other. While the stylus pen 102c is being accommodated in the accommodation space 111, the second sealing member 131b can move along the accommodating portion 111b. In the state where the inclined surfaces I1 and I2 are positioned to face each other, the second sealing member 131b connect the second sound waveguide 125c to the first sound waveguide 119 such that the speaker module 115a can radiate sound to the outside through the radiation holes 125b. In the state where the stylus pen 102c is separated from the accommodation space 111, the speaker module 115a may radiate the sound through a portion of the accommodation space 111.

In the electronic device of the present embodiment of the present disclosure, since the first output hole and the input hole are arranged on the inclined surfaces I1 and I2 of the accommodating portion 111b and the protrusion 125e in arranging the first output hole and the input hole on the accommodating portion 111b and the protrusion 125e, respectively, it is possible to prevent the second sealing member 131b from being rubbed against any other portion (e.g., the inner wall of the accommodation space 111 or the accommodating portion 111b). For example, since it is possible to prevent the second sealing member 131b from being rubbed against any other portion until the input hole, which is formed in the stylus pen 102c, is connected to the first output hole, the endurance of the second sealing member 131b can be further enhanced.

According to various embodiments of the present disclosure, the first sealing member 131a may also be arranged in the first output hole. For example, the above-mentioned first sealing member 131a may be arranged in the first output hole, and the above-mentioned second sealing member 131b may be arranged in the input hole. When the stylus pen 102c is fully inserted into the accommodation space 111, the second sealing member 131b may be abutted on the first sealing member 131a so as to interconnect the first and second sound waveguides 119 and 125c, and it is possible to prevent a sound pressure output from the speaker module 115a from leaking out through any other passage (e.g., a passage other than the passages that are connected to the first and second sound waveguides 119 and 125c and the radiation hole 125b).

The above-described first and second sealing members 131a and 131b may be made of an elastic material, such as silicon, urethane, or a poron tape. In the case where the sealing members made of the elastic material are abutted on each other, an elastic force, which biases the inclined surfaces I1 and I2 to be spaced apart from each other, may be generated. According to various embodiments of the present disclosure, even if the sealing members made of the elastic material are compressed to generate the elastic force, the electronic device may maintain the sealing members in the closely contacted state by using the structure of fixing the stylus pen 102c to the accommodation space 111 (e.g., the above-mentioned fastening recess). For example, the connection structure between the first and second sound waveguides 119 and 125c can be further stabilized.

Figure 8:
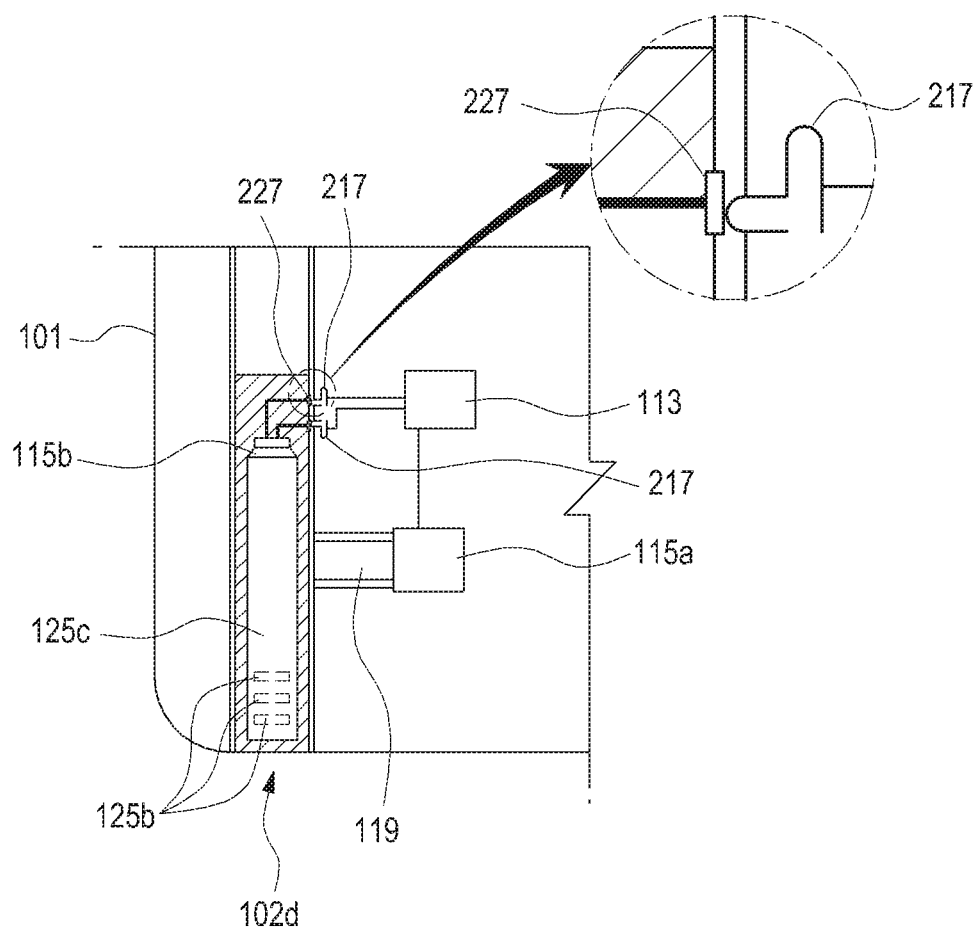
FIG. 8 is a diagram illustrating an aspect in which an accessory device is accommodated in an electronic device according to an embodiment of the present disclosure.

FIG. 8 is a diagram illustrating an aspect in which an accessory device is accommodated in an electronic device according to an embodiment of the present disclosure.

Referring to FIG. 8, according to various embodiments of the present disclosure, the electronic device 100 may further include a second speaker module 115b that is embedded in the stylus pen 102d separately from the speaker module 115a (hereinafter, referred to as a "first speaker module") that is arranged in the main body 101. Even if a structure that is connected to the first speaker module 115a (e.g., the above-mentioned input holes or the sealing members) is not arranged, the second speaker module 115b is embedded in the stylus pen 102d so that sound can be output. However, in order to transmit a sound signal, the second speaker module 115b may be connected to the IC chip 113 (e.g., an audio module).

In order to electrically connect the second speaker module 115b and the IC chip 113 to each other, proper signal lines and connection device may be provided within the main body 101 and the stylus pen 102d. The connection device may include a connection terminal (a C-clip) 217 that is embedded in the main body 101, and connection pads 227 that are arranged in the stylus pen 102d. A portion of each of the connection terminals 217 protrudes to the accommodation space 111 to come in contact with each of the connection pads 227 in the state where the stylus pen 102d is fully inserted into the accommodation space 111.

In the state where the stylus pen 102d is separated from the accommodation space 111, the first speaker module 115a may output sound under the control of the IC chip 113. The first speaker module 115a is connected to the accommodation space 111 through the first sound waveguide 119, and a portion of the accommodation space 111 may be used as a passage that receives the sound, which is output from the first speaker module 115a, and radiates the sound to the outside. For example, even if a separate radiation hole for radiating the sound, which is output from the first speaker module 115a, to the outside is not formed, the sound may be radiated to the outside through a portion of the accommodation space 111.

When the stylus pen 102d is accommodated in the accommodation space 111, the second speaker module 115b may be connected to the IC chip 113. At this time, the IC chip 113 may block a sound signal to be provided to the first speaker module 115a, and may provide the sound signal to the second speaker module 115b. The sound, which is output from the second speaker module 115b, may progress through the second sound waveguide 125c that is formed within the stylus pen 102d and may be radiated to the outside through the radiation holes 125b that are formed in one end of the stylus pen 102d.

Figure 9:
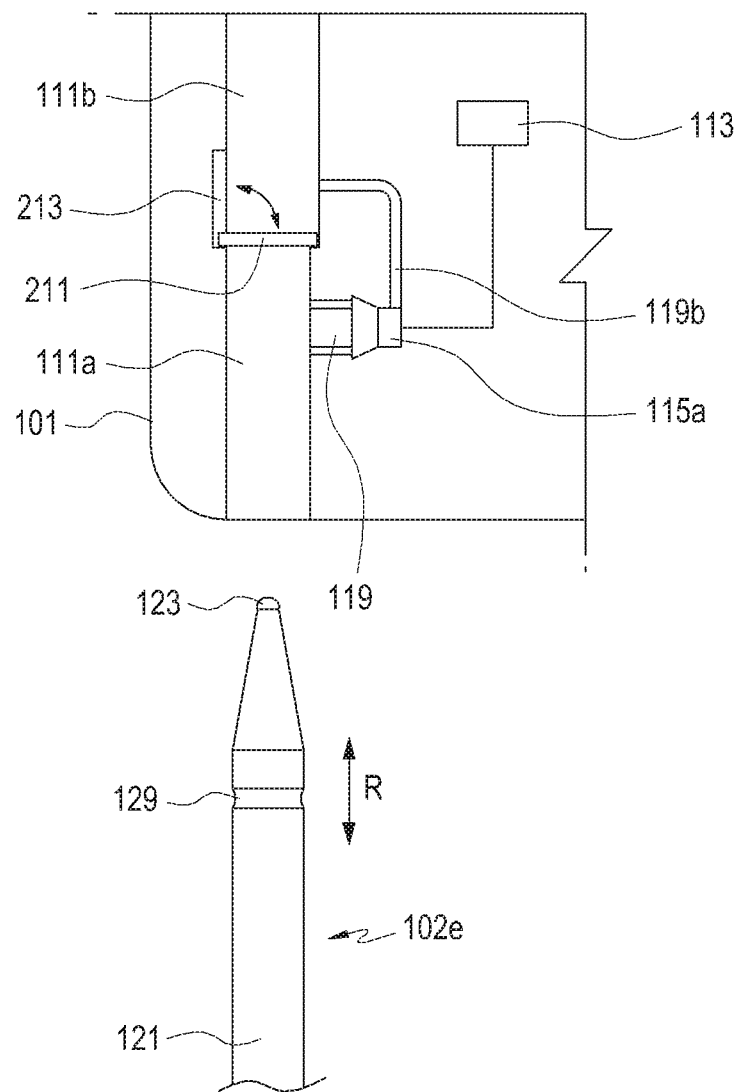
FIG. 9 is a diagram illustrating an aspect in which an accessory device is being accommodated in an electronic device according to an embodiment of the present disclosure.
Figure 10:
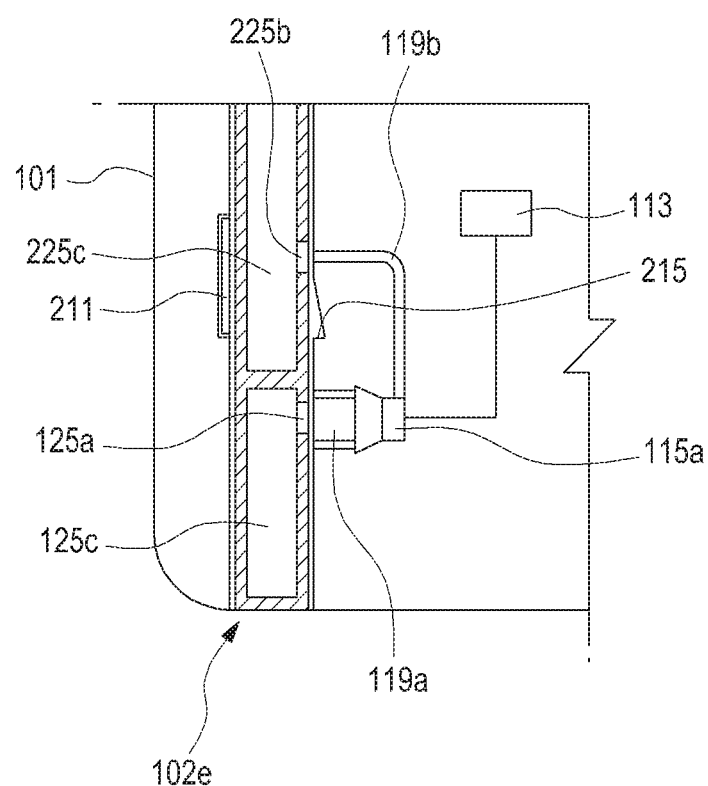
FIG. 10 is a diagram illustrating an aspect in which an accessory device is accommodated in an electronic device according to an embodiment of the present disclosure.

FIG. 9 is a diagram illustrating an aspect in which an accessory device is being accommodated in an electronic device according to an embodiment of the present disclosure. FIG. 10 is a diagram illustrating an aspect in which an accessory device is accommodated in an electronic device according to an embodiment of the present disclosure.

Referring to FIGS. 9 and 10, the electronic device 100 of the present embodiment may extend the back volume of the speaker module by using the accommodation space of the accessory device or another portion of the inner space of the accessory device. In describing the present embodiment of the present disclosure, the components that have been described in the preceding embodiments of the present disclosure, such as the magnetic body, the Hall sensor, the sealing members, will not be specifically mentioned. However, the components may also be selectively installed in the present embodiment.

Referring to FIGS. 9 and 10, the electronic device 100 may further include a third sound waveguide 119b that is connected to the accommodation space from the rear side of the speaker module 115a within the main body 101. Within the accommodation space, the location at which the third sound waveguide 119b is connected may be located more inside that the location at which the first sound waveguide 119a is connected (e.g., the above-mentioned first output hole) from the outside of the main body 101. A diaphragm member 211 may be installed within the accommodation space.

The diaphragm member 211 may be arranged between the location at which the first sound waveguide 119a is connected and the location at which the third sound waveguide 119b is connected so as to selectively divide the accommodation space and may isolate the divided portions from each other. For example, as illustrated in FIG. 9, in the state where the stylus pen 102e is separated from the accommodation space, the diaphragm member 211 may divide the accommodation space into two portions and my isolate the portions from each other. In the state where the diaphragm member 211 divides the accommodation space into two portions and isolates the portions from each other, the peripheral edge of the diaphragm member 211 may be in close contact with a stepped portion 215 that is formed on the inner wall of the accommodation space. Among the two spaces that are divided by the diaphragm member 211, the space 111a that is connected to the outside of the main body 101 (hereinafter, referred to as a "first space") may provide a passage that radiates the sound, which is output from the speaker module 115a, to the outside. Among the two spaces that are divided by the diaphragm member 211, the space 111b that is isolated from the first space 111a (hereinafter, referred to as a "second space") may be connected to the rear side of the speaker module 115a to be used as a space that extends the back volume of the speaker module 115a.

As described above, when the accommodation space is separated into two spaces using the diaphragm member 211 and each of the two divided spaces 111a and 111b is connected to the speaker module 115a in the state where the stylus pen 102e is separated from the main body 101, one portion of the accommodation space may be used as a sound waveguide, and the other portion may be used as a resonance space. Accordingly, the inner space of the electronic device 100 can be more efficiently used and the sound quality can be further improved.

According to various embodiments of the present disclosure, the stylus pen 102e may include a second sound waveguide 125c and a resonance space 225c therein. When the stylus pen 102e is accommodated in the main body 101 (e.g., in the accommodation space), the diaphragm member 211 may be accommodated in the accommodation recess 213 that is formed on the inner wall of the accommodation space. In the state where the stylus pen 102e is accommodated in the main body 101, the second sound waveguide 125c may be connected to the speaker module 115a through the first sound waveguide 119a. The stylus pen 102e may include a second input hole 225b that connects the resonance space 225c to the third sound waveguide 119b. For example, the resonance space 225c may be connected to the back volume of the speaker module 115a through the second input hole 225b and the third sound waveguide 119b.

As described above, according to various embodiments of the present disclosure, the sound quality of a miniaturized and slimmed electronic device can be improved by using an accommodation space of an accessory device (e.g., a stylus pen) or an inner space of the accessory device as a sound waveguide or a resonance space.

As described above, According to various embodiments of the present disclosure, there is provided an electronic device including a main body that provides an accommodation space, a speaker module that outputs sound, and an accessory device that is accommodated in the accommodation space.

In a state where the accessory device is accommodated in the accommodation space, the accessory device may provide a passage that transmits the sound output from the speaker module, and in a state where the accessory device is separated from the accommodation space, the accommodation space may provide the passage that transmits the sound output from the speaker module.

According to various embodiments of the present disclosure, the electronic device may further include a first output hole that is formed in an inner wall of the accommodation space, a first input hole that is formed in an outer peripheral surface of the accessory device, and a second output hole that is formed in an end of the accessory device.

In the state where the accessory device is accommodated in the accommodation space, the first input hole may be positioned to face the first output hole, and the speaker module may be installed within the main body so as to output the sound through the first output hole.

According to various embodiments of the present disclosure, the electronic device may further include a first sealing member that is installed to the main body, and an elastic member that compresses the sealing member.

The first sealing member may receive an elastic force of the elastic member to be in close contact with a periphery of the first input hole, thereby connecting the first input hole to the first output hole.

According to various embodiments of the present disclosure, the electronic device may further include a protrusion that is formed on an outer peripheral surface of one end of the accessory device, and an accommodating portion that is formed in the inner wall of the accommodation space.

The first input hole may be arranged on the protrusion, and the first sealing member is arranged within the accommodating portion.

According to various embodiments of the present disclosure, the electronic device may further include a second sealing member that is installed to the accessory device, and an accommodating portion that extends from the one end of the accommodation space to the first output hole on the inner wall of the accommodation space.

The second sealing member may move along the accommodating portion while the accessory device is being accommodated in the accommodation space. In the state where the accessory device is accommodated in the accommodation space, the second sealing member may connect the first input hole to the first output hole.

According to various embodiments of the present disclosure, the electronic device may further include a sound waveguide that is formed within the accessory device. The sound waveguide may extend from the first input hole to the second output hole.

According to various embodiments of the present disclosure, the electronic device may further include an IC chip that is embedded in the electronic device, and a detection device configured to detect whether the accessory device is accommodated in the accommodation space.

The IC chip may control the output of the speaker module as the detection device detects that the accessory device is accommodated.

According to various embodiments of the present disclosure, the detection device may include a magnetic body that is installed in the accessory device, and a Hall sensor that is arranged adjacent to the accommodation space, and the Hall sensor may be electrically connected to the IC chip.

According to various embodiments of the present disclosure, the speaker module may include a first speaker module that is installed inside the main body, and a second speaker module that is embedded in the accessory device, the IC chip may provide a sound signal to the first speaker module in the state where the accessory device is separated from the accommodation space, and the IC chip may provide a sound signal to the second speaker module in the state where the accessory device is accommodated in the accommodation space.

According to various embodiments of the present disclosure, in the state where the accessory device is separated from the accommodation space, sound output from the first speaker module may be radiated to the outside of the main body through the accommodation space.

According to various embodiments of the present disclosure, in the state where the accessory device is accommodated in the accommodation space, the IC chip may block the sound signal that is provided to the first speaker module.

According to various embodiments of the present disclosure, the accessory device may include a stylus pen.

Figure 11:
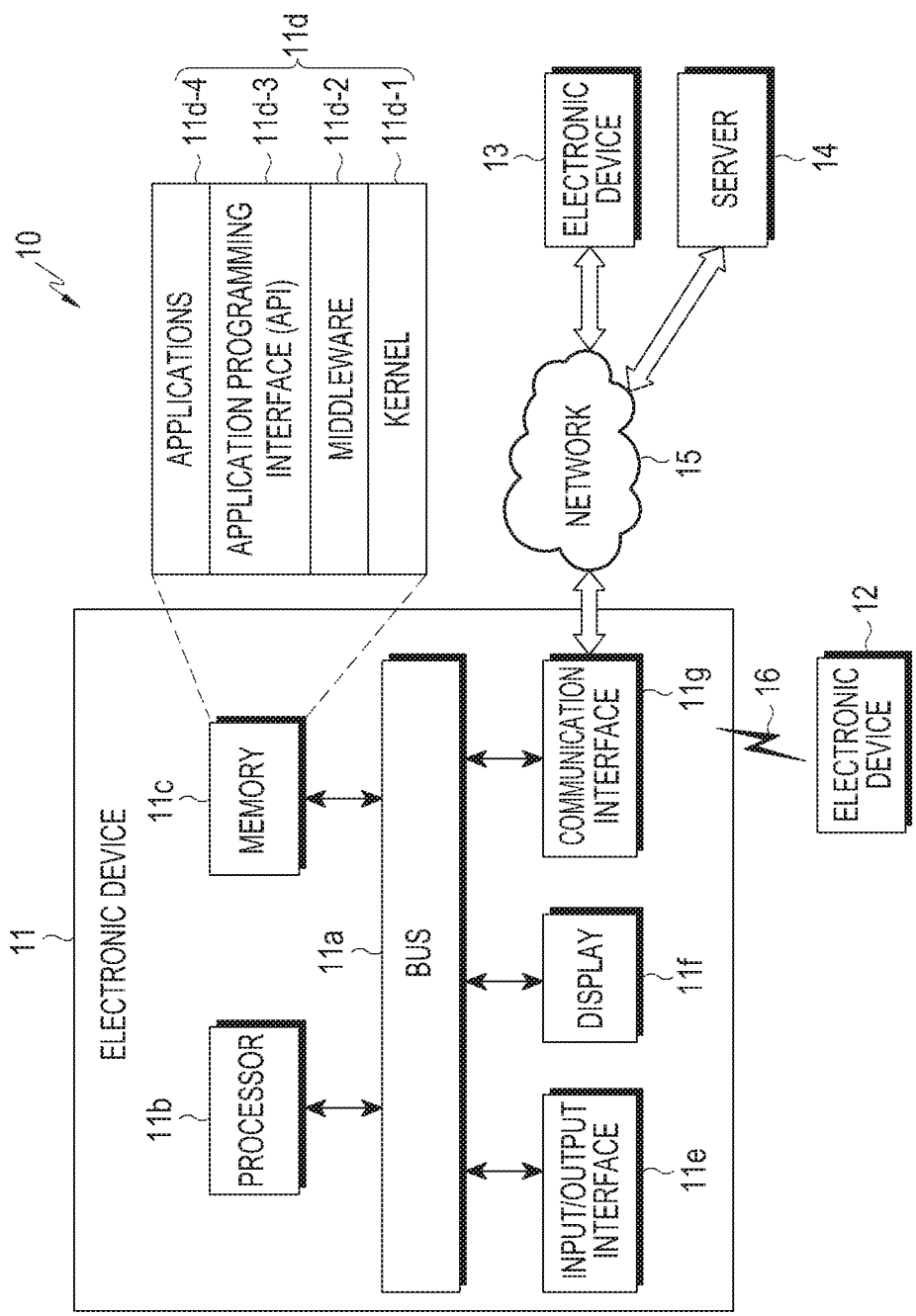
FIG. 11 is a view illustrating a network environment that includes an electronic device according to various embodiments of the present disclosure.

FIG. 11 is a view illustrating a network environment that includes an electronic device according to various embodiments of the present disclosure.

Referring to FIG. 11, an electronic device 11 may include a bus 11a, a processor 11b, a memory 11c, an input/output interface 11e, a display 11f, and a communication interface 11g. In a certain embodiment of the present disclosure, the electronic device 11 may omit at least one of the above-mentioned components or may additionally include other components.

The bus 11a may include, for example, a circuit that connects the above-mentioned components 11a to 11g and transmits communication (e.g., a control message and/or data) between the components.

The processor 11b may include one or more of a CPU, an AP, and a communication processor (CP). The processor 11b may execute, for example, an arithmetic operation or data processing that is related to a control and/or communication of one or more other components of the electronic device 11.

The memory 11c may include a volatile memory and/or a non-volatile memory. The memory 11c may store, for example, commands or data that are related to one or more other components of the electronic device 11. According to one embodiment of the present disclosure, the memory 11c may store software and/or a program 11d. The program 11d may include, for example, a kernel 11d-1, a middleware 11d-2, an application programming interface (API) 11d-3, and/or an application program (or an "application") 11d-4. At least one of the kernel 11d-1, the middleware 11d-2, and the API 11d-3 may be referred to as an operating system (OS).

The kernel 11d-1 may control or manage, for example, system resources (e.g., the bus 11a, the processor 11b, or the memory 11c) that are used for executing operations or functions implemented in the other programs (e.g., the middleware 11d-2, the API 11d-3, or the application programs 11d-4). In addition, the kernel 11d-1 may provide an interface that allows the middleware 11d-2, the API 11d-3, or the application program 11d-4 to access individual components of the electronic device 11 so as to control or manage the system resources.

The middleware 11d-2 may play an intermediary role such that, for example, the API 11d-3 or the application programs 11d-4 may communicate with the kernel 11d-1 so as to exchange data.

In addition, the middleware 11d-2 may process one or more task requests according to priority. For example, the middleware 11d-2 may assign the priority to be capable of using a system resource of the electronic device 11 (e.g., the bus 11a, the processor 11b, or the memory 11c) to at least one of the application programs 11d-4. For example, the middleware 11d-2 may perform scheduling, load balancing, and the like, for the one or more task requests by processing the one or more requests according to the assigned priority.

The API 11d-3 is, for example, an interface that allows the application 11d-4 to control functions provided from the kernel 11d-1 or the middleware 11d-2, and may include, for example, one or more interfaces or functions (e.g., commands) for a file control, a window control, an image processing, or a character control.

The input/output interface 11e may serve as an interface to transmit commands or data, which are entered from, for example, a user or any other external device, to the other component(s) of the electronic device 11. In addition, the input/output interface 11e may output commands or data, which are received from the other component(s) of the electronic device 11, to the user or the other external device.

The display 11f may include, for example, a liquid crystal display (LCD), a light emitting diode (LED) display, an organic LED (OLED) display, or a microelectromechanical systems (MEMS) display, or an electronic paper display. The display 11f may display various contents (e.g., a text, an image, a video, an icon, a symbol, and the like) to, for example, the user. The display 11f may include a touch screen, and may receive a touch input, a gesture input, a proximity input, or a hovering input using, for example, an electronic pen or a part of the user's body.

The communication interface 11g may set, for example, communication between the electronic device 11 and an external device (e.g., a first external electronic device 12, a second external device 13, or a server 14). For example, the communication interface 11g may communicate with the external device (e.g., the second external electronic device 13 or the server 14) by being connected with a network 15 through wired or wireless communication.

The wireless communication may use at least one of, for example, long-term evolution (LTE), LTE advanced (LTE-A), code division multiple access (CDMA), wideband CDMA (WCDMA), universal mobile telecommunication system (UMTS), wireless broadband (WiBro), or global system for mobile communication (GSM), as a communication protocol. In addition, the wireless communication may include, for example, short range communication 16. The short range communication 16 may include at least one of Wi-Fi, near field communication (NFC), or global navigation satellite system (GNSS). GNSS may include, for example, at least one of global positioning system (GPS), global navigation satellite system (Glonass), Beidou navigation satellite system (hereinafter, "Beidou"), or Galileo, the European global satellite-based navigation system. Herein, "GPS" may be interchangeably used with "GNSS" below. The wired communication may use at least one of, for example, universal serial bus (USB), high definition multimedia interface (HDMI), recommended standard 232 (RS-232), and plain old telephone service (POTS). The network 15 may include a telecommunication network, for example, at least one of a computer network (e.g., a LAN or a wide-area network (WAN)), the internet, and a telephone network.

Each of the first and second external electronic devices 12 and 13 may be a type of device that is the same as or different from the electronic device 11. According to one embodiment of the present disclosure, the server 14 may include a group of one or more servers. According to various embodiments of the present disclosure, all or some of the operations to be executed by the electronic device 11 may be executed by another electronic device or a plurality of other electronic devices (e.g., the first and second external electronic devices 12 and 13 or the server 14). According to one embodiment of the present disclosure, in the case where the electronic device 11 should perform a certain function or service automatically or by a request, the electronic device 11 may request some functions or services that are associated therewith from the other electronic devices (e.g., the first and second external electronic devices 12 and 13 or the server 14), instead of or in addition to executing the functions or service by itself. The other electronic devices (e.g., the first and second external electronic devices 12 and 13 or the server 14) may execute the requested functions or additional functions, and may transmit the results to the electronic device 11. The electronic device 11 may provide the requested functions or services by processing the received results as they are or additionally. For this purpose, for example, a cloud computing technique, a distributed computing technique, or a client-server computing technique may be used.

Figure 12:
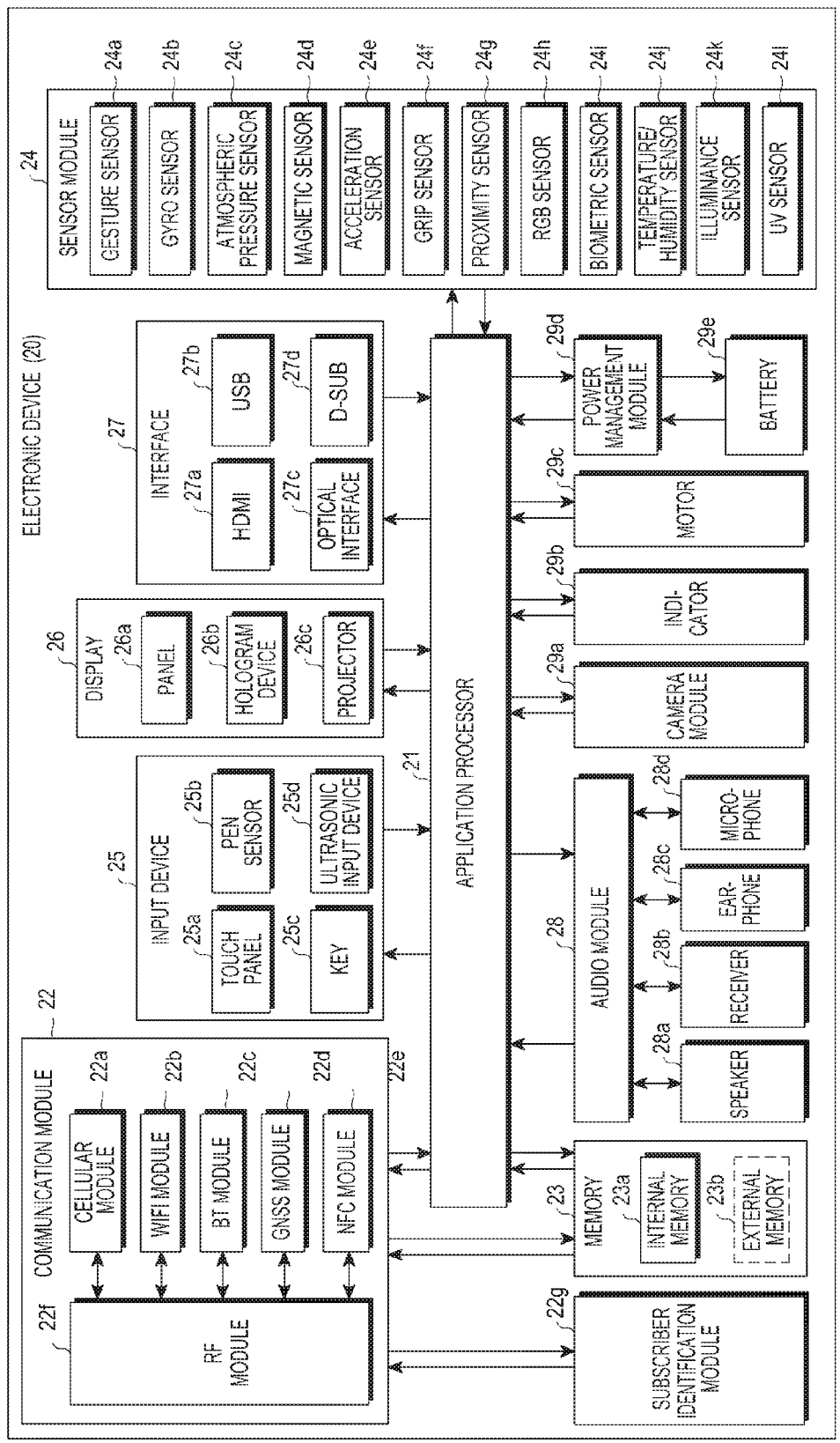
FIG. 12 is a block diagram illustrating an electronic device according to various embodiments of the present disclosure.

FIG. 12 is a block diagram illustrating an electronic device according to various embodiments of the present disclosure.

Referring to FIG. 12, an electronic device 20 may include, for example, the entirety or a portion of the electronic device 11 illustrated in FIG. 11. The electronic device 20 may include at least one AP 21, a communication module 22, a subscriber identification module (SIM) 22g, a memory 23, a sensor module 24, an input device 25, a display 26, an interface 27, an audio module 28, a camera module 29a, a power management module 29d, a battery 29e, an indicator 29b, and a motor 29c.

The AP 21 may drive, for example, an OS or an application program so as to control a plurality of hardware or software components connected thereto, and may also perform various data processing and arithmetic operations. The AP 21 may be implemented by, for example, a system-on-chip (SoC). According to one embodiment of the present disclosure, the AP 21 may further include a graphics processing unit (GPU) and/or an image signal processor. The AP 21 may include at least some components (e.g., the cellular module 22*a*) among the components illustrated in FIG. 12. The AP 21 may load and process a command or data received from at least one of the other components (e.g., the non-volatile memory) in a volatile memory and may store various data in the non-volatile memory.

The communication module 22 may have a configuration that is the same as or similar to the communication interface 11*g* of FIG. 11. The communication module 22 may include, for example, a cellular module 22*a*, a Wi-Fi module 22*b*, a Bluetooth module 22*c*, a GNSS module 22*d* (e.g., a GPS module, a Glonass module, a Beidou module, a Galileo module, and the like), an NFC module 22*e*, and a radio frequency (RF) module 22*f*.

The cellular module 22*a* may provide, for example, a voice call, a video call, a message service, or an internet service through a communication network. According to one embodiment of the present disclosure, the cellular module 22*a* may perform discrimination and authentication of the electronic device 20 within the communication network by using the SIM (e.g., a SIM card) 22*g*. According to one embodiment of the present disclosure, the cellular module 22*a* may perform at least some of the multimedia control functions that may be provided by the AP 21. According to one embodiment of the present disclosure, the cellular module 22*a* may include a CP.

Each of the Wi-Fi module 22*b*, the BT module 22*c*, the GNSS module 22*d*, and the NFC module 22*e* may include, for example, a processor to process data transmitted/received through a corresponding module. According to a certain embodiment of the present disclosure, at least some (e.g., two or more) of the cellular module 22*a*, the Wi-Fi module 22*b*, the Bluetooth module 22*c*, the GNSS module 22*d*, and the NFC module 22*e* may be incorporated in a single integrated chip (IC) or an IC package.

The RF module 22*f* may transmit/receive a communication signal (e.g., an RF signal). The RF module 22*f* may include, for example, a transceiver, a power amp module (PAM), a frequency filter, a low noise amplifier (LNA), or an antenna. According to another embodiment of the present disclosure, at least one of the cellular module 22*a*, the Wi-Fi module 22*b*, the BT module 22*c*, the GPS module 22*d*, and the NFC module 22*e* may transmit/receive an RF signal through one or more separate RF modules.

The SIM 22*g* may include, for example, a card that includes a SIM and/or an embedded SIM, and may also include intrinsic identification information (e.g., integrated circuit card identifier (ICCID)) or subscriber information (e.g., international mobile subscriber identity (IMSI)).

The memory 23 (e.g., the memory 11*c*) may include, for example, an internal memory 23*a* or an external memory 23*b*. The internal memory 23*a* may include at least one of, for example, a volatile memory (e.g., a dynamic random access memory (DRAM), a static RAM (SRAM), or a synchronous DRAM (SDRAM)), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, a solid state drive (SSD), and the like).

The external memory 23*b* may further include a flash drive (e.g., a compact flash (CF), a secure digital (SD), a micro-SD, a mini-SD, an extreme digital (xD), a memory stick, and the like). The external memory 23*b* may be functionally and/or physically connected to the electronic device 20 through various interfaces.

The sensor module 24 may measure a physical quantity or may detect an operating status of the electronic device 20, and may then convert the measured or detected information into electric signals. The sensor module 24 may include at least one of, for example, a gesture sensor 24*a*, a gyro sensor 24*b*, an atmospheric pressure sensor 24*c*, a magnetic sensor 24*d*, an acceleration sensor 24*e*, a grip sensor 24*f*, a proximity sensor 24*g*, a color sensor 24*h* (e.g., a red, green, blue (RGB) sensor), a biometric sensor 24*i*, a temperature/humidity sensor 24*j*, an illuminance sensor 24*k*, and a ultraviolet (UV) sensor 24*l*. Additionally or alternatively, the sensor module 24 may include, for example, an E-nose sensor, an electromyography (EMG) sensor (not illustrated), an electroencephalogram (EEG) sensor, an electrocardiogram (ECG) sensor, an infrared (IR) sensor, an iris sensor, and/or a fingerprint sensor. The sensor module 24 may further include a control circuit for controlling one or more sensors incorporated therein. In a certain embodiment of the present disclosure, the electronic device 20 may further include a processor configured to control the sensor module 24 as a part of the AP 21 or separate from the AP 21 so as to control the sensor module 24 while the AP 21 is in the sleep state.

The input device 25 may include a touch panel 25*a*, a (digital) pen sensor 25*b*, a key 25*c*, or an ultrasonic input device 25*d*. As the touch panel 25*a*, at least one of, for example, a capacitive type touch panel, a resistive type touch panel, an infrared type touch panel, and an ultrasonic type panel may be used. In addition, the touch panel 25*a* may further include a control circuit. In addition, the touch panel 25*a* may further include a tactile layer so as to provide a tactile reaction to a user.

The (digital) pen sensor 25*b* may be, for example, a portion of the touch panel or may include a separate recognition sheet. The key 25*c* may include, for example, a physical button, an optical key, or a keypad. The ultrasonic input device 25*d* may detect, through a microphone (e.g., a microphone 28*d*) in the electronic device 20, ultrasonic waves that are generated by an input tool so that data corresponding to the detected ultrasonic waves can be confirmed.

The display 26 (e.g., the display 110 may include a panel 26*a*, a hologram device 26*b*, or a projector 26*c*. The panel 26*a* may include a configuration that is the same as or similar to that of the display 11*f* of FIG. 11. The panel 26*a* may be implemented to be flexible, transparent, or wearable. The panel 26*a* may be configured as a single module with the touch panel 25*a*. The hologram device 26*b* may show a stereoscopic image in the air using interference of light. The projector 26*c* may project light onto a screen so as to display an image. The screen may be located inside or outside the electronic device 20. According to one embodiment of the present disclosure, the display 26 may further include a control circuit to control the panel 26*a*, the hologram device 26*b*, or the projector 26*c*.

The interface 27 may include, for example, an HDMI 27*a*, a USB 27*b*, an optical interface 27*c*, or a D-subminiature (D-sub) 27*d*. For example, the interface 27 may be included in the communication interface 11g illustrated in FIG. 11. Additionally or alternatively, the interface 27 may include, for example, a mobile high-definition link (MHL) interface, an SD card/multi-media card (MMC) interface, or an infrared data association (IrDA) standard interface.

The audio module 28 may bi-directionally convert, for example, sounds and electric signals. At least some of the components of the audio module 28 may be included in, for example, the input/output interface 11e illustrated in FIG. 11. The audio module 28 may process sound information input or output through, for example, a speaker 28a, a receiver 28b, an earphone 28c, or a microphone 28d.

The camera module 29a is a device that is capable of photographing, for example, a still image and a moving image. According to one embodiment of the present disclosure, the camera module 29a may include at least one image sensor (e.g., a front sensor or a rear sensor), a lens, an image signal processor (ISP), or a flash (e.g., an LED or a xenon lamp).

The power management module 29d may manage, for example, the electric power of the electronic device 20. According to one embodiment of the present disclosure, the power management module 29d may include a power management IC (PMIC), a charger IC, or a battery or fuel gauge. The PMIC may be configured in a wired and/or wireless charge type. The wireless charge type may include, for example, a magnetic resonance type, a magnetic induction type, or an electromagnetic wave type, and may further include an additional circuit for wireless charging, such as a coil loop, a resonance circuit, a rectifier, and the like. The battery gauge may measure the residual amount of the battery 29e and a voltage, a current, or a temperature during the charge. The battery 29e may include, for example, a rechargeable battery and/or a solar battery.

The indicator 29b may indicate a specific status of the electronic device 20 or of a part thereof (e.g., the AP 21), such as a booting status, a message status, a charged status, and the like. The motor 29c may convert an electric signal into a mechanical vibration, and may generate, for example, a vibration or a haptic effect. Although not illustrated, the electronic device 20 may include a processor (e.g., a GPU) to support a mobile TV. The processor to support a mobile TV may process media data according to the standards of, for example, digital multimedia broadcasting (DMB), digital video broadcasting (DVB), or media flow.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. In addition, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the processor 11), may cause the one or more processors to execute the function corresponding to the instruction. The computer-readable storage medium may be, for example, the memory 11.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 13:
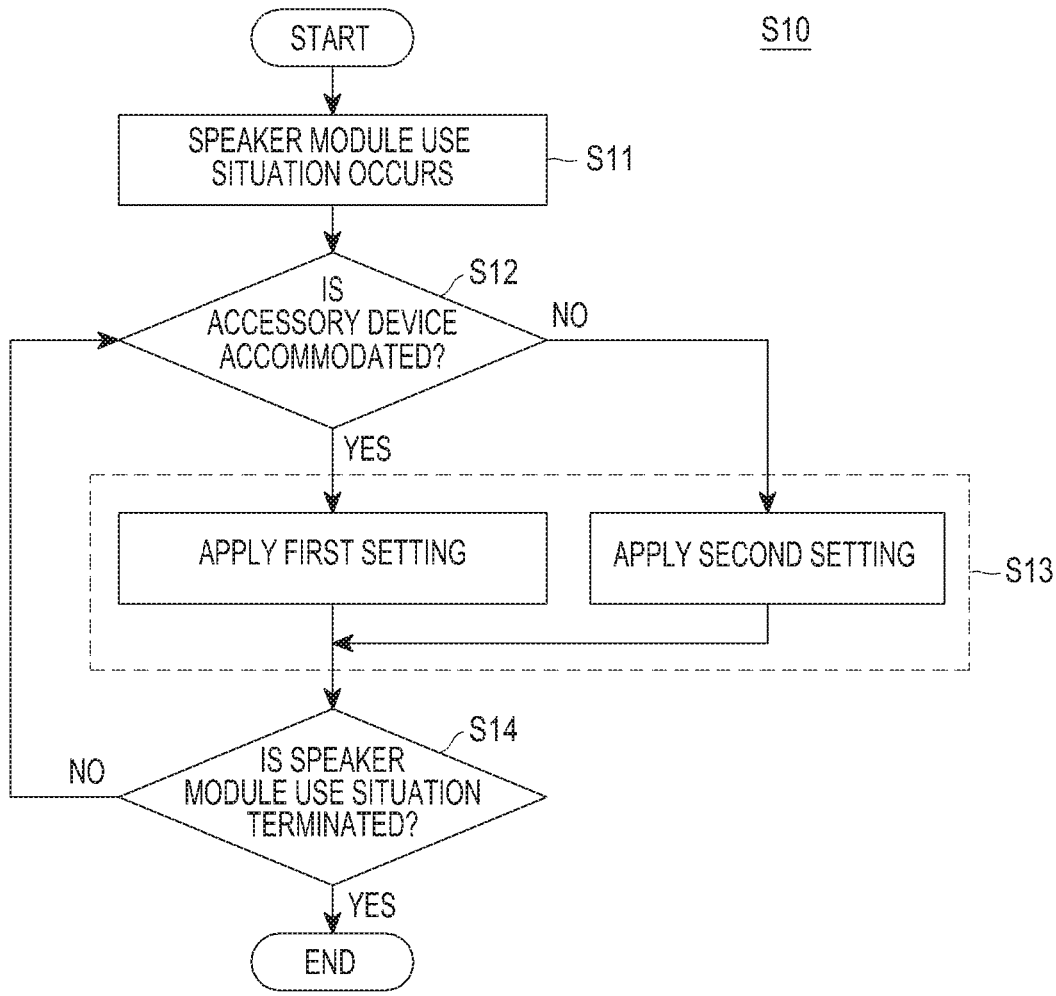
FIG. 13 is a flowchart illustrating a control method of an electronic device according to various embodiments of the present disclosure.

FIG. 13 is a flowchart illustrating a control method of an electronic device according to various embodiments of the present disclosure.

Referring to FIG. 13, according to various embodiments of the present disclosure, referring to the configurations of the above-mentioned electronic devices 100, 11, and 20, an electronic device may differ in sound radiation environment depending on whether an accessory device (e.g., the above-mentioned stylus pen) is accommodated. For example, before the stylus pen 102a is accommodated, the sectional area of the radiation passage, which is provided by the accommodation space 111, may differ from the sectional area of the radiation passage, which is provided through the stylus pen 102a. According to various embodiments of the present disclosure, an electronic device control method S10 may alleviate a deviation of sound quality, which is caused depending on whether the stylus pen 102a is accommodated, by adjusting the power of the speaker module 115a, and the like.

Referring to FIG. 13, the electronic device control method S10 may include an operation of activating the speaker module 115a when a situation of using the speaker module 115a occurs at operation S11. Here, the "situation of using the speaker module" may refer to, for example, a situation of operating the electronic device 100 at a multimedia mode so as to reproduce music or a video image, making a video call, receiving an incoming call at a bell sound mode, or performing an operation according to a user's setting, such as an alarm. When the situation of using the speaker module 115a occurs based on the user's operation or setting, the processor (e.g., the above-mentioned processor 21) or an audio module (e.g., the above-mentioned audio module 28) of the electronic device 100 may activate the speaker module 115a. The processor or the audio module may be equipped in the IC chip 113.

The IC device control method S10 may include an operation of detecting whether the stylus pen 102a is accommodated in the accommodation space 111 in the state where the speaker module 115a is activated at operation S12. For example, when the above-mentioned Hall sensor 117 detects a magnetic field that is formed by the magnetic body 127, the processor or the audio module may detect that the stylus pen 102a is accommodated in the accommodation space 111. As described above, such a detection device may be implemented through a switch member, and the like, that is arranged to interference with the stylus pen 102a that is accommodated in the accommodation space 111 while being mechanically operated, in addition to the above-mentioned Hall sensor 117.

The electronic device control method at operation S10 may include an operation of providing different sound signals to the speaker module 115a depending on whether the stylus pen 102a is accommodated. For example, even if the electronic device reproduces the same music, the processor or the audio module may provide sound signals to the speaker module 115a such that, in the state where the stylus pen 102a is accommodated, the speaker module outputs sound at a higher volume, and in the state where the stylus pen 102a is separated, the speaker module outputs sound at a relatively lower volume (a volume that is lower than the volume output in the state where the stylus pen 102a is accommodated). In a specific embodiment of the present disclosure, descriptions are made, by way of an example, assuming that the sound signals adjust the volume depending on whether the stylus pen, but the present disclosure is not limited thereto. For example, depending on whether the stylus pen is accommodated, a sound signal suitable therefor may be provided so as to optimize the sound by adjusting an amplification gain through the audio module or performing an equalizer control or an audio filter control (e.g., a gain adjustment per sound frequency band).

The electronic device control method S10 may include an operation of confirming whether the use situation of the speaker module 115a is terminated while the sound is output through speaker module 115a at operation S14. For example, when video image reproduction is completed, the processor or the audio module or the processor may determine that the use situation of the speaker module 115a is terminated and may deactivate the speaker module 115a. In addition, when the user executes forced termination in the state where the speaker module 115a is used, the processor or the audio module may terminate a currently working mode and may deactivate the speaker module 115a. When the use situation of the speaker module 115a is continued, the processor or the audio module may re-execute the operation of detecting again whether the stylus pen 102a is accommodated.

Figure 14:
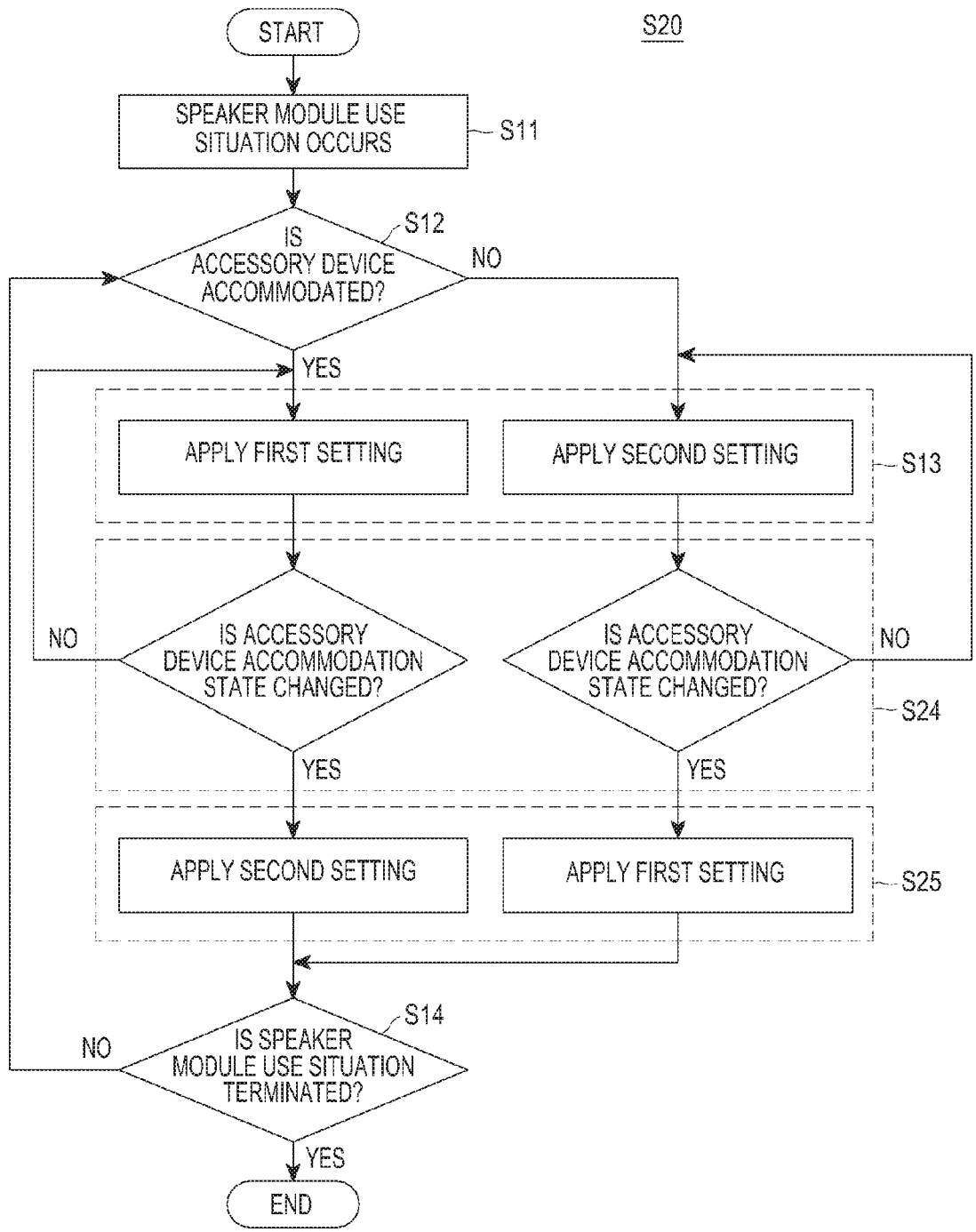
FIG. 14 is a flowchart illustrating a control method of an electronic device according to various embodiments of the present disclosure.

FIG. 14 is a flowchart illustrating a control method of an electronic device according to various embodiments of the present disclosure.

Referring to FIG. 14, according to various embodiments of the present disclosure, an electronic device control method at operation S20 may further include an operation of detecting the accommodated state of the stylus pen 102a at operation S24 (hereinafter, referred to as a "detecting operation"), and an operation of changing a sound signal to be provided to the speaker module 115a at operation S25 (hereinafter, an "adjusting operation").

The detecting operation S24 may be performed after the operation of providing different sound signals to the speaker module 115a depending on whether the stylus pen 102a is accommodated at operation S13 and while the sound is output through the speaker module 115a. Even while the speaker module 115a outputs the sound, the stylus pen 102a may be accommodated or not according to the user's need. The electronic device 100 may detect whether the accommodated state of the stylus pen 102a is changed even while the speaker module 115a outputs the sound. In addition, such a detecting operation S24 may performed through the above-mentioned Hall sensor 117 and the magnetic body 127.

When the change is not detected in the accommodated state of the stylus pen 102a in the detecting operation S24, the processor or the audio module may maintain the current setting. When a change of the accommodated state of the stylus pen 102a is detected in the detecting operation S24, the processor or the audio module may change the sound signal to be provided to the speaker module 115a in the adjusting operation S25. For example, when the speaker module 115a is operated by applying the first setting in the state where the stylus pen 102a is accommodated, the speaker module 115a may be operated by applying the second setting when the separation of the stylus pen 102a is detected.

As described above, according to various embodiments of the present disclosure, there is provided a method of controlling an electronic device that radiates sound through an accommodation space or an accessory device that is accommodated in the accommodation space.

The electronic device control method may include an operation of activating a speaker module that outputs sound (hereinafter, "activating operation), an operation of detecting whether the accessory device is accommodated in the accommodation space (hereinafter, "first detecting operation"), and an operation of providing different sound signals to the speaker module depending on whether the accessory device is accommodated (hereinafter, "first adjusting operation").

According to various embodiments of the present disclosure, in the first detecting operation, a Hall sensor may detect whether a magnetic body, which is arranged in the accessory device, is placed close to the Hall sensor.

According to various embodiment of the present disclosure, the above-described electronic device control method may further include an operation of detecting a change in an accommodated state of the accessory device while the first adjusting operation is performed (hereinafter, "second detecting operation"), and an operation of changing a sound signal to be provided when the change in the accommodated state of the accessory device is detected (hereinafter, "second adjusting operation").

According to various embodiments of the present disclosure, in the second detecting operation, Hall sensor detects whether a magnetic body, which is arranged in the accessory device, is placed close to the Hall sensor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a main body configured to provide an accommodation space;
a first speaker device configured to output sound and installed inside of the main body; and
a stylus pen configured to be selectively accommodated in the accommodation space and formed with a sound waveguide,
wherein, in a state where the stylus pen is accommodated in the accommodation space, the stylus pen is further configured to provide a first passage including the sound waveguide through which the sound output from the first speaker device is transmitted, and
wherein, in a state where the stylus pen is separated from the accommodation space, the accommodation space provides a second passage through which the sound output from the first speaker device is transmitted.

2. The electronic device of claim 1, further comprising:
a first output hole that is formed in an inner wall of the accommodation space;
a first input hole that is formed in an outer peripheral surface of the stylus pen; and
a second output hole that is formed in an end of the stylus pen,
wherein, in the state where the stylus pen is accommodated in the accommodation space, the first input hole is positioned to face the first output hole, and wherein the first speaker device is installed within the main body so as to output the sound through the first output hole.

3. The electronic device of claim 2, further comprising:
a first sealing member that is installed to the main body; and
an elastic member that compresses the first sealing member,
wherein the first sealing member receives an elastic force of the elastic member to be in close contact with a periphery of the first input hole, thereby connecting the first input hole to the first output hole.

4. The electronic device of claim 3, further comprising:
a protrusion that is formed on an outer peripheral surface of one end of the stylus pen; and
an accommodating portion that is formed in the inner wall of the accommodation space,
wherein the first input hole is arranged on the protrusion, and the first sealing member is arranged within the accommodating portion.

5. The electronic device of claim 2, further comprising:
a second sealing member that is installed to the stylus pen; and
an accommodating portion that extends from one end of the accommodation space to the first output hole on the inner wall of the accommodation space,
wherein the second sealing member moves along the accommodating portion while the stylus pen is being accommodated in the accommodation space, and
wherein, in the state where the stylus pen is accommodated in the accommodation space, the second sealing member connects the first input hole to the first output hole.

6. The electronic device of claim 2,
wherein the sound waveguide extends from the first input hole to the second output hole.

7. The electronic device of claim 1, further comprising:
an integrated circuit (IC) chip that is embedded in the electronic device; and
a detection device configured to detect whether the stylus pen is accommodated in the accommodation space,
wherein the IC chip is configured to control the output of the first speaker device as the detection device detects that the stylus pen is accommodated.

8. The electronic device of claim 7,
wherein the detection device comprises a magnetic body that is installed in the stylus pen, and a Hall sensor that is arranged adjacent to the accommodation space, and
wherein the Hall sensor is electrically connected to the IC chip.

9. An electronic device comprising:
a main body configured to provide an accommodation space;
a first speaker device configured to output sound and installed inside of the main body;
a stylus pen configured to be selectively accommodated in the accommodation space and formed with a sound waveguide;
an integrated circuit (IC) chip that is embedded in the electronic device;
a detection device configured to detect whether the stylus pen is accommodated in the accommodation space; and
a second speaker device that is embedded in the stylus pen,
wherein the IC chip is configured to provide a first electrical sound signal to the first speaker device and the accommodation space provides a passage through which sound output from the first speaker device is transmitted in the state where the stylus pen is separated from the accommodation space, and wherein the IC chip is configured to provide a second electrical sound signal to the second speaker device in the state where the stylus pen is accommodated in the accommodation space and the sound waveguide provides another passage through which another sound output from the second speaker device is transmitted.

10. The electronic device of claim 9, wherein, in the state where the stylus pen is separated from the accommodation space, sound output from the first speaker device is radiated to the outside of the main body through the accommodation space.

11. The electronic device of claim 9, wherein, in the state where the stylus pen is accommodated in the accommodation space, the IC chip is configured to block the first electrical sound signal that is provided to the first speaker device.

* * * * *